(12) United States Patent
Zhou et al.

(10) Patent No.: US 12,149,396 B2
(45) Date of Patent: Nov. 19, 2024

(54) BEAM ESTABLISHMENT METHOD AND APPARATUS

(71) Applicant: Huawei Technologies Co., Ltd., Shenzhen (CN)

(72) Inventors: Jianwei Zhou, Hangzhou (CN); Chenlei Xu, Hangzhou (CN); Hejia Luo, Hangzhou (CN); Xiaolu Wang, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 309 days.

(21) Appl. No.: 17/738,863

(22) Filed: May 6, 2022

(65) Prior Publication Data

US 2022/0263701 A1    Aug. 18, 2022

Related U.S. Application Data

(63) Continuation of application No. PCT/CN2020/124271, filed on Oct. 28, 2020.

(30) Foreign Application Priority Data

Nov. 8, 2019    (CN) .......................... 201911089943.5

(51) Int. Cl.
*H04L 27/26*    (2006.01)
*H04W 56/00*    (2009.01)
*H04W 74/0833*    (2024.01)

(52) U.S. Cl.
CPC ....... *H04L 27/2678* (2013.01); *H04W 56/001* (2013.01); *H04W 74/0833* (2013.01)

(58) Field of Classification Search
CPC ........... H04W 56/001; H04W 56/0015; H04W 74/08–0825; H04L 27/2655; H04L 27/2659; H04L 27/2675; H04L 27/2678
See application file for complete search history.

(56) References Cited

U.S. PATENT DOCUMENTS

2019/0223226 A1    7/2019  Zhao et al.
2019/0364603 A1    11/2019 Qian et al.
(Continued)

FOREIGN PATENT DOCUMENTS

CN    108322282 A    7/2018
CN    108809597 A    11/2018
(Continued)

OTHER PUBLICATIONS

Mediatek Inc., "Prach design for NTN scenario," 3GPP TSG-RAN WG1 #99 Meeting, Reno, USA, R1-1912124, Total 13 pages, 3rd Generation Partnership Project, Valbonne, France (Nov. 18-24, 2019).

(Continued)

*Primary Examiner* — Michael Thier
*Assistant Examiner* — Prince A Mensah
(74) *Attorney, Agent, or Firm* — Leydig, Voit & Mayer, Ltd.

(57)    ABSTRACT

A terminal apparatus is provided. The terminal apparatus obtains synchronization signal and physical broadcast channel (PBCH) blocks (SSBs) in a plurality of beams; then determines a target beam in the plurality of beams based on an association relationship between an SSB index and a first random access preamble, where the first random access preamble is determined based on a cyclic shift and/or an order of symbols; and finally sends the random access preamble by using the target beam to initiate a random access request. A communication device receives the first random access preamble in the random access request sent by the terminal apparatus, and then, determines, based on the association relationship, the target beam accessed by the terminal apparatus. The first random access preamble is determined based on the cyclic shift and/or the order of symbols.

12 Claims, 10 Drawing Sheets

(56) References Cited

U.S. PATENT DOCUMENTS

| | | | |
|---|---|---|---|
| 2020/0059390 A1* | 2/2020 | Zhang | H04L 1/0007 |
| 2020/0068616 A1* | 2/2020 | Qian | H04B 7/0695 |
| 2020/0296765 A1* | 9/2020 | Kim | H04W 56/0015 |
| 2022/0166485 A1* | 5/2022 | Lee | H04B 7/0695 |
| 2022/0191947 A1* | 6/2022 | Nishio | H04J 13/107 |

FOREIGN PATENT DOCUMENTS

| | | | |
|---|---|---|---|
| CN | 109041250 A | 12/2018 | |
| CN | 109327912 A | 2/2019 | |
| CN | 110050506 A | 7/2019 | |
| CN | 110312309 A | 10/2019 | |
| CN | 110380837 A | 10/2019 | |
| CN | 111183684 A | 5/2020 | |
| EP | 3522663 A1 | 8/2019 | |
| WO | 2019066575 A1 | 4/2019 | |

OTHER PUBLICATIONS

LG Electronics et al., "Physical layer design of initial access signals and channels for NR-U," 3GPP TSG RAN WG1 #98bis, Chongqing, China, R1-1910816, Total 17 pages, 3rd Generation Partnership Project, Valbonne, France (Oct. 14-20, 2019).

* cited by examiner

```
ssb-perRACH-OccasionAndCB-PreamblesPerSSB      CHOICE {
    oneEighth                                   ENUMERATED
{n4,n8,n12,n16,n20,n24,n28,n32,n36,n40,n44,n48,n52,n56,n60,n64},
    oneFourth                                   ENUMERATED
{n4,n8,n12,n16,n20,n24,n28,n32,n36,n40,n44,n48,n52,n56,n60,n64},
    oneHalf                                     ENUMERATED
{n4,n8,n12,n16,n20,n24,n28,n32,n36,n40,n44,n48,n52,n56,n60,n64},
    one                                         ENUMERATED
{n4,n8,n12,n16,n20,n24,n28,n32,n36,n40,n44,n48,n52,n56,n60,n64},
    two                                         ENUMERATED
{n4,n8,n12,n16,n20,n24,n28,n32},
    four                                        INTEGER (1..16),
    eight                                       INTEGER (1..8),
    sixteen                                     INTEGER (1..4)
}
```
FIG. 2A
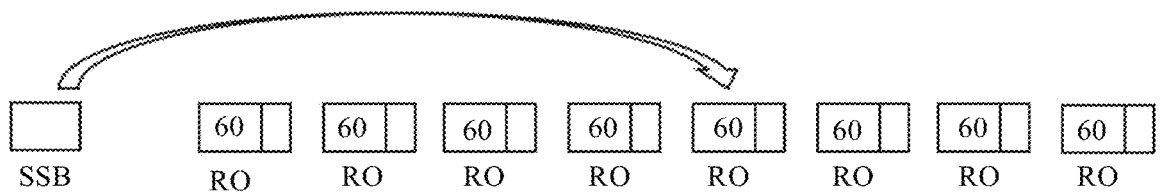
FIG. 2B
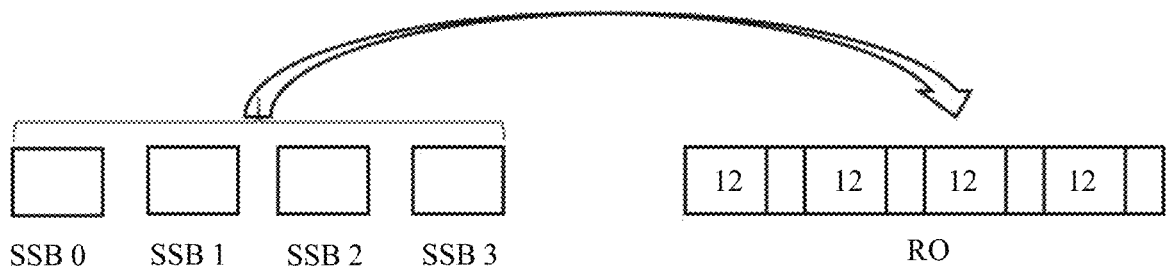
FIG. 2C

```
RACH-ConfigGeneric ::=      SEQUENCE {
prach-ConfigurationIndex    INTEGER (0..255),
msg1-FDM                    ENUMERATED {one, two, four, eight},
...
ssb-ro-cv                   INTEGER (0..838),
...
}
```

FIG. 3C

```
RACH-ConfigGeneric ::=      SEQUENCE {
    prach-ConfigurationIndex    INTEGER (0..255),
    msg1-FDM                    ENUMERATED {one, two, four, eight},
    ...
    ssb-ro-n                    INTEGER (...),
    ssb-ro-offset               INTEGER (...),
    ...
}
```

FIG. 3D

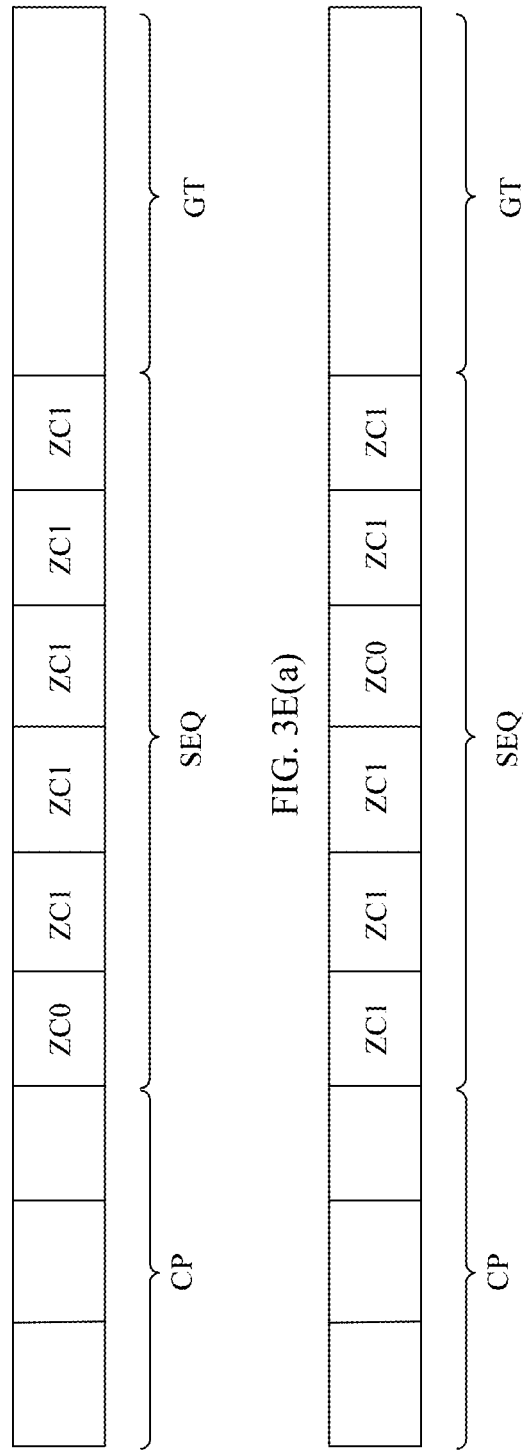

BEAM ESTABLISHMENT METHOD AND APPARATUS

CROSS-REFERENCE TO RELATED APPLICATIONS

This application is a continuation of International Application No. PCT/CN2020/124271, filed on Oct. 28, 2020, which claims priority to Chinese Patent Application No. 201911089943.5, filed on Nov. 8, 2019. The disclosures of the aforementioned applications are hereby incorporated by reference in their entireties.

TECHNICAL FIELD

This application relates to the field of communication technologies, and in particular, to a beam establishment method and apparatus.

BACKGROUND

A terrestrial network (TN) is a base station communication network, and a non-terrestrial network (NTN) is a satellite mobile communication network. Future 5G and 5G evolved networks not only need to meet a plurality of service requirements, but also need to provide wider service coverage. Satellite communication is slightly affected by geographical conditions, so that a global coverage can be achieved. Therefore, it is of great importance to develop satellite communication. Especially, when local communication infrastructure is severely damaged by natural disasters and normal communication is unavailable, satellite communication can provide strong communication support for effective disaster relief. In addition, in areas in which ground base stations are difficult to be deployed, such as oceans, deserts, and mountains, effective communication can be performed through satellite communication, to ensure full coverage of communication.

A beam connection needs to be established for communication in the NTN. In an NR standard, SSB scanning is performed periodically in a time sharing mode. After detecting an SSB greater than a threshold, a terminal performs uplink random access based on a random access channel occasion (RACH Occasion, RO) corresponding to the SSB. Based on different time-frequency resources or different physical random access channel (PRACH) sequences for uplink random access, a gNB (a 5G base station) distinguishes between beams accessed by the terminal, to complete initial beam establishment. However, in an NTN scenario, because a coverage area increases, a quantity of beams in the NTN scenario is much larger than that in a terrestrial network scenario. As shown in FIG. 1, dense beams are distributed in a satellite coverage area. Therefore, in an initial access phase of UE, more SSBs are required to support beam scanning.

In a conventional method, for scanning a downlink SSB beam, it is mainly proposed that the downlink SSB is sent on a plurality of beams simultaneously in a code division mode. In this case, a problem of a long period of time for scanning the downlink SSB beam is resolved to some extent. However, because a quantity of uplink PRACH sequences and a time-frequency resource for sending the PRACH sequences are limited, an association period between an SSB and an RO becomes longer, in other words, a time interval at which the terminal initiates random access becomes longer. In addition, a round-trip transmission delay in the NTN scenario is larger than that in the terrestrial network scenario. To resolve this problem, a designed PRACH sequence in the NTN is generally lengthened, and the association period between the SSB and the RO is further increased. Consequently, user experience is affected.

SUMMARY

Embodiments of this application provide a beam establishment method and apparatus. According to solutions of embodiments of this application, a cyclic shift is added to a preamble sequence or different symbol ordering is performed on a preamble sequence, so that one preamble sequence is associated with a plurality of SSBs. This increases a quantity of SSB indexes that can be associated with one RO, and reduces duration of an association period between the RO and the SSB, so that a time interval at which a terminal apparatus initiates random access is reduced, and user experience is effectively improved.

According to a first aspect, an embodiment of this application provides a beam establishment method, where the method includes: A terminal apparatus obtains a plurality of synchronization signal and PBCH blocks SSBs in a plurality of beams, where the SSB includes an SSB index: the terminal apparatus determines a target beam in the plurality of beams based on an association relationship between the SSB index and a first random access preamble, where the first random access preamble is determined based on a cyclic shift and/or an order of symbols, the symbol is a symbol of a sequence part in the first random access preamble, and the sequence part includes at least two types of symbols; and the terminal apparatus sends the first random access preamble by using the target beam, to initiate a random access request.

In this embodiment of this application, after synchronization is performed based on an SSB delivered by a satellite, UE obtains a first random access preamble, where the first random access preamble is determined based on a cyclic shift and/or an order of symbols. Then, the UE determines, based on an association relationship between the first random access preamble and the SSB index, a target beam accessed by the UE, and finally, initiates random access by using the target beam, to complete beam establishment. In this process, because the random access preamble is determined based on the cyclic shift and/or the order of symbols, a quantity of available random access preamble sequences on one RO is increased, and a quantity of UEs that can access a network device by using the same RO increases, so that a time interval at which the terminal apparatus initiates random access is reduced, and user experience is effectively improved.

Optionally, the determining a target beam in the plurality of beams based on an association relationship between the SSB index and a first random access preamble includes: obtaining the first random access preamble; and determining a target SSB based on the association relationship between the first random access preamble and the SSB index, and determining a beam corresponding to the target SSB as the target beam.

Optionally, the cyclic shift is obtained through calculation based on at least the SSB index and a sequence length parameter of the first random access preamble.

Optionally, the cyclic shift satisfies $C_v = (n * SSB_{index} + \text{offset}) \% L_{RA}$, where $SSB_{index}$ indicates the SSB index, offset indicates an offset, $L_{RA}$ indicates a sequence length of the first random access preamble, n is an integer, and % indicates a remainder operation.

Optionally, after the SSBs in the plurality of beams are obtained, the method further includes: The terminal apparatus receives indication information, where the indication information is used to indicate the cyclic shift and/or the order of symbols.

According to a second aspect, an embodiment of this application provides a beam establishment method, where the method includes:

A communication apparatus receives a first random access preamble in a random access request; and the communication apparatus determines, based on an association relationship between the first random access preamble and a synchronization signal and PBCH block SSB index, a target beam accessed by a terminal apparatus, where the first random access preamble is determined based on a cyclic shift and/or an order of symbols, the symbol is a symbol of a sequence part in the first random access preamble, and the sequence part includes at least two types of symbols.

Optionally, before the first random access preamble in the random access request is received, the method further includes: The communication apparatus sends indication information, where the indication information is used to indicate the cyclic shift and/or the order of symbols.

According to a third aspect, an embodiment of this application provides a terminal apparatus, where the apparatus includes: a receiving unit, configured to obtain a plurality of synchronization signal and PBCH blocks SSBs in a plurality of beams, where the SSB includes an SSB index: a processing unit, configured to determine a target beam in the plurality of beams based on an association relationship between the SSB index and a first random access preamble, where the first random access preamble is determined based on a cyclic shift and/or an order of symbols, the symbol is a symbol of a sequence part in the first random access preamble, and the sequence part includes at least two types of symbols; and a sending unit, configured to send the first random access preamble by using the target beam, to initiate a random access request.

In an optional example, after the SSBs in the plurality of beams are obtained, the receiving unit is further configured to: receive indication information, where the indication information is used to indicate the cyclic shift and/or the order of symbols.

According to a fourth aspect, an embodiment of this application provides a communication apparatus, where the communication apparatus includes: an input unit, configured to receive a first random access preamble in a random access request: a processing unit, configured to determine, based on an association relationship between the first random access preamble and a synchronization signal and PBCH block SSB index, a target beam accessed by a terminal apparatus, where the first random access preamble is determined based on a cyclic shift and/or an order of symbols, the symbol is a symbol of a sequence part in the first random access preamble, and the sequence part includes at least two types of symbols; and an output unit, configured to send a random access response to the terminal apparatus by using the target beam.

In an optional example, the output unit is further configured to: send indication information, where the indication information is used to indicate the cyclic shift and/or the order of symbols.

According to a fifth aspect, an embodiment of this application provides a communication apparatus, including a processor and a memory, where the processor and the memory are electrically coupled.

The processor invokes a part or all of computer program instructions stored in the memory, so that the communication apparatus performs any method according to the first aspect or the second aspect.

In an optional example, the apparatus further includes a transceiver. The transceiver is configured to communicate with another device, for example, the transceiver receives a plurality of synchronization signal and PBCH blocks SSBs in a plurality of beams sent by a network device.

According to a sixth aspect, an embodiment of the present disclosure provides a computer-readable storage medium, where the computer storage medium includes program instructions. When the program instructions are run on a computer, the computer is enabled to perform any method according to the first aspect or the second aspect.

According to a seventh aspect, an embodiment of this application provides a computer program product including instructions. When the computer program product is run on a computer or a processor, the computer or the processor is enabled to perform the method according to any one of the first aspect or the second aspect and the possible implementations of the first aspect or the second aspect.

These aspects or other aspects of this application are clearer and more comprehensible in the following descriptions of the embodiments.

BRIEF DESCRIPTION OF DRAWINGS

To describe the technical solutions in embodiments of this application or in the conventional technology more clearly, the following briefly describes the accompanying drawings for describing embodiments or the conventional technology. It is clear that, the accompanying drawings in the following description merely show some embodiments of this application, and a person of ordinary skill in the art may still derive other drawings from these accompanying drawings without creative efforts.

FIG. 2A is a schematic diagram of establishment of an association relationship between an SSB and an RO according to an embodiment of this application:

FIG. 2B is a schematic diagram of an association between an SSB and an RO according to an embodiment of this application:

FIG. 2C is a schematic diagram of another association between an SSB and an RO according to an embodiment of this application:

FIG. 3C is a schematic diagram of signaling of delivering a cyclic shift value according to an embodiment of this application:

FIG. 3D is a schematic diagram of signaling of delivering a related value according to an embodiment of this application:

FIG. 3E(a) and FIG. 3E(b) are a schematic diagram of different symbol orders of a preamble sequence according to an embodiment of this application:

DETAILED DESCRIPTION

Figure 1:
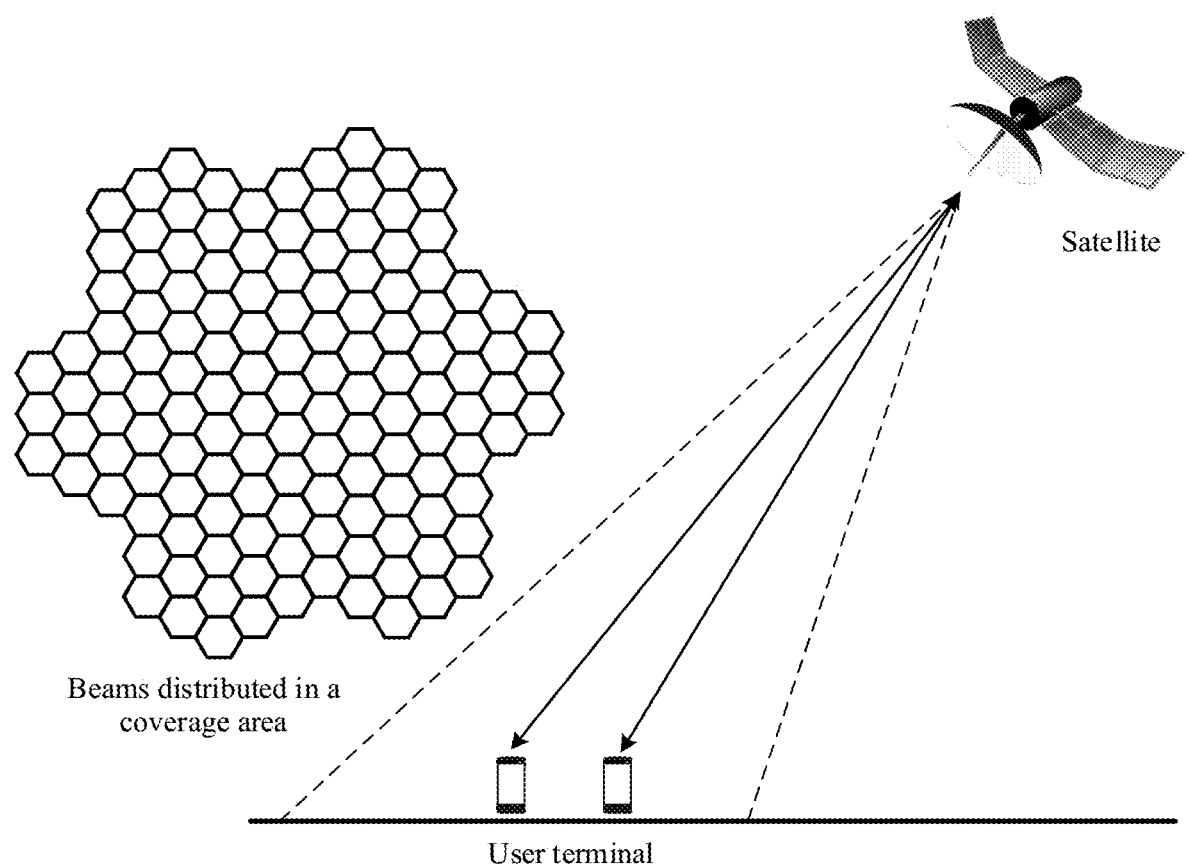
FIG. 1 is a schematic diagram of NTN beam coverage according to an embodiment of this application.

To help understand embodiments of this application, some terms used in embodiments of this application are first explained and described. It may be understood that the following terms are used to help better understand application scenarios and technical solutions of this application, so that the technical features in the solutions can be quickly understood based on the terms. Explanation of the terms does not constitute an absolute limitation on the technical features.

(1) A terminal apparatus is also referred to as terminal equipment, user equipment (UE), a mobile station (MS), a mobile terminal (MT), or the like, and is a device that provides voice and/or data connectivity for a user. For example, the terminal equipment includes a handheld device, a vehicle-mounted device, an Internet of Things device, or the like that has a wireless connection function. Currently, the terminal equipment may be a mobile phone, a tablet computer, a notebook computer, a palmtop computer, a mobile Internet device (MID), a wearable device, a virtual reality (VR) device, an augmented reality (AR) device, a wireless terminal in industrial control, a wireless terminal in self driving, a wireless terminal in remote surgery, a wireless terminal in a smart grid, a wireless terminal in transportation safety, a wireless terminal in a smart city, a wireless terminal in a smart home, or the like. The terminal equipment may alternatively be terminal equipment in a 5G network, terminal equipment in a future evolved public land mobile network (PLMN) or another future communication system, or the like.

(2) A communication apparatus is an apparatus or a device configured to communicate with the terminal equipment. The communication apparatus may be a base station, or may be an evolved NodeB (eNB, or eNodeB) in an LTE system. The communication apparatus may alternatively be a radio controller in a cloud radio access network (CRAN) scenario, or the network device may be a relay station, an access point, a vehicle-mounted device, a next generation base station (next generation Node B, gNodeB) in a 5G network, or the like. The network device mentioned in embodiments of this application may alternatively be a satellite, or may be referred to as a satellite base station. The communication apparatus mainly provides a wireless access service for the terminal equipment, schedules a radio resource for terminal equipment accessing the communication apparatus, and provides a reliable wireless transmission protocol, a data encryption protocol, and the like. The satellite base station may alternatively be a base station that uses a man-made earth satellite, a high-altitude aircraft, or the like as a wireless communication base station. Alternatively, the apparatus may be a communication device or a chip in a communication device. The satellite base station may be a geostationary earth orbit (GEO) satellite, may be a medium earth orbit (MEO) satellite or a low earth orbit (LEO) satellite in a non-geostationary earth orbit (NGEO), may be a high altitude platform station (HAPS), or the like.

(3) A beam is a shape formed on the surface of the earth by electromagnetic waves emitted from satellite antennas. Just as a light beam of a flashlight has a specific range, the beam is determined by a transmit antenna. Alternatively, a signal transmitted by a satellite is not radiated at 360°, but is a signal wave transmitted intensively in a specific azimuth. One satellite cell includes at least one satellite beam. In some cases, the satellite beam may also be considered as one cell.

(4) A synchronization signal and PBCH block is formed by combining a primary synchronization sequence, a secondary synchronization sequence, a physical broadcast channel, and a demodulation reference signal in NR. In other words, a PSS, an SSS, a PBCH, and a DMRS are received in four consecutive orthogonal frequency division multiplexing (OFDM) symbols, and then form the synchronization signal and PBCH block (Synchronization/PBCH block, SSB). The synchronization signal and PBCH block is mainly used for downlink synchronization.

(5) Random access is a process that starts from a time at which a user sends a random access preamble to attempt to access a network to a time at which a basic signaling connection is established between the user and the network. The random access includes contention-based random access and non-contention-based random access. The contention-based random access includes four steps: UE initiates a random access request (a Random Access Preamble or a Msg 1) to a network device: the network device sends an access response (a Random Access Response or a Msg 2) to the UE: the UE sends a connection request (Scheduled Transmission or a Msg 3) to the network device; and the network device performs conflict resolution (Contention Resolution or a Msg 4). The non-contention-based random access includes three steps: The network device sends a preamble assignment (Random Access Preamble assignment or a Msg 0) to the UE: the UE initiates a random access request (a Random Access Preamble or a Msg 1) to the network device; and the network device sends an access response (a Random Access Response or a Msg 2) to the UE.

The term "and/or" in this application describes an association relationship between associated objects and represents that three relationships may exist. For example, A and/or B may represent the following three cases: Only A exists, both A and B exist, and only B exists. The character "/" usually indicates an "or" relationship between the associated objects.

In this application, "a plurality of" means two or more than two.

In the description of this application, terms such as "first" and "second" are used only for purposes of distinguishing descriptions, but cannot be understood as indicating or implying relative importance, or as indicating or implying a sequence.

In addition, the term "for example" in embodiments of this application is used to represent giving an example, an illustration, or a description. Any embodiment or implementation solution described as an "example" in this application should not be explained as being more preferred or having more advantages than another embodiment or implementation solution. Exactly, the word "example" is used to present a concept in a specific manner.

Embodiments of this application provide a method and an apparatus for implementing an automatic neighbor relationship that are applicable to a satellite network. The method and the apparatus are based on a same technical concept. Because problem solving principles of the method and the apparatus are similar, mutual reference may be made to implementations of the apparatus and the method. Repeated parts are not described again.

The technical solutions in embodiments of this application may be applied to various communication systems, for example, a satellite communication system. The satellite communication system may be integrated with a conventional mobile communication system. For example, the mobile communication system may be a 4th generation (4G) communication system (for example, a long term evolution (LTE) system), a worldwide interoperability for microwave access (WiMAX) communication system, a 5th generation (5G) communication system (for example, a new radio (NR) system), or a future mobile communication system.

The following describes in detail embodiments of this application with reference to the accompanying drawings.

Beam establishment in NR includes two processes: SSB index-based downlink synchronization and RO-based random access. The downlink synchronization means that UE synchronizes with a received beam signal. A satellite delivers an SSB by using a beam, and the UE synchronizes with a beam signal based on an SSB in a scanned beam.

A physical random access channel (PRACH) is a channel used by the UE to send a random access related signal, and a PRACH sequence is a related sequence of the random access signal. In embodiments of this application, the PRACH sequence is a preamble sequence. The SSB has a plurality of sending opportunities in a time-domain period, and can use different beams. Therefore, in the NR, random access can be initiated only after a beam scanning signal of the SSB covers the UE, downlink synchronization is performed, and PRACH-related information is obtained. In other words, the SSB needs to establish an association relationship with an RO, and the base station determines, based on a resource location of an uplink PRACH of the UE, a beam for sending a downlink random access response (RAR).

A random access procedure includes contention-based random access and non-contention-based random access. A maximum of 64 random access preambles can be allocated to one RO for allocation to the UE for random access. In the contention-based random access procedure, a preamble index is randomly selected by the UE, and in the non-contention-based random access procedure, a preamble index is indicated by the satellite. A value range of the preamble index is associated with an SSB index because the SSB index is associated with the RO.

Contention-based random access is used as an example. FIG. 2A is a schematic diagram of establishment of an association relationship between an SSB and an RO according to an embodiment of this application. The relationship between the SSB and the RO is indicated by using a field shown in FIG. 2A, and ssb-perRACH-OccasionAndCB-PreamblesPerSSB in PRACH parameter configuration is used to configure: 1. a quantity of SSBs corresponding to each RO, where the quantity ranges from ⅛ to 16; and 2. a quantity of contention-based preamble (CB preamble) sequences used for each SSB.

(1) When ssb-perRACH-Occasion<1, in other words, one SSB corresponds to a plurality of ROs, a sequence of a relationship between an SSB index and a CB preamble in the PRACH is as follows:
Preamble indexes in an RACH occasion are in ascending order;
CB preamble indexes in each RO are in ascending order;
when a frequency resource of a frequency multiplex RO is configured, indexes are in ascending order based on frequency domain;
when a plurality of ROs in a PRACH slot are configured, indexes are in ascending order based on the PRACH slot; and
when a plurality of PRACH slots are configured, indexes are in ascending order based on the PRACH slots.

FIG. 2B is a schematic diagram of an association between an SSB and an RO according to an embodiment of this application. As shown in FIG. 2B, ssb-perRACH-Occasion=⅛ and CB-PreamblesPerSSB=60 are used as examples. One SSB is mapped to eight ROs, and a CB preamble sequence on each RO ranges from 0 to 59.

(2) When ssb-perRACH-Occasion>=1, in other words, a plurality of SSBs correspond to one RACH occasion, n consecutive CB preambles starting from n×64/N correspond to an SSB n, where N=ssb-perRACH-Occasion, n=CB-PreamblesPerSSB, n∈[0, N−1], where 64 is a maximum quantity of preambles in a cell.

FIG. 2C is a schematic diagram of another association between an SSB and an RO according to an embodiment of this application. As shown in FIG. 2C, ssb-perRACH-Occasion=4 and CB-PreamblesPerSSB=12 are used as examples. Four SSBs correspond to one RO, and each SSB uses 12 CB preambles. CB preambles corresponding to the four SSBs are 0 to 11, 16 to 27, 32 to 43, and 48 to 59.

A specific association time is required to associate the SSB indexes with the RO. A concept of an association period is introduced herein. To be specific, the association period indicates a quantity of PRACH configuration periods in time domain that are required for associating all SSB indexes with the RO, where the PRACH configuration period is a period of configuring the RO.

Figure 2D:
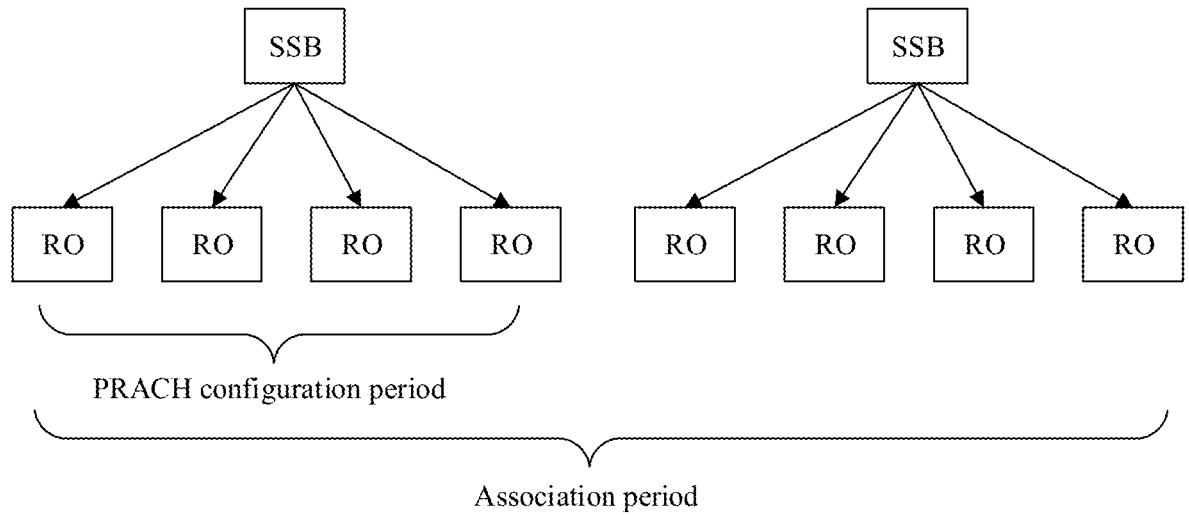
FIG. 2D is a schematic diagram of an association period between an SSB and an RO according to an embodiment of this application.

When one SSB corresponds to a plurality of ROs, a relationship between the association period and the PRACH configuration period is as follows: T=⌈n*r/R⌉×t, where T indicates the association period, t indicates the PRACH configuration period, n indicates a quantity of SSBs, r indicates a quantity of ROs corresponding to one SSB, and R indicates a quantity of ROs in one PRACH configuration period. FIG. 2D is a schematic diagram of an association period between an SSB and an RO according to an embodiment of this application. As shown in FIG. 2D, assuming that one SSB corresponds to four ROs, and the four ROs are exactly in one PRACH configuration period, association period=PRACH configuration period×a quantity of SSBs.

Figure 2E:
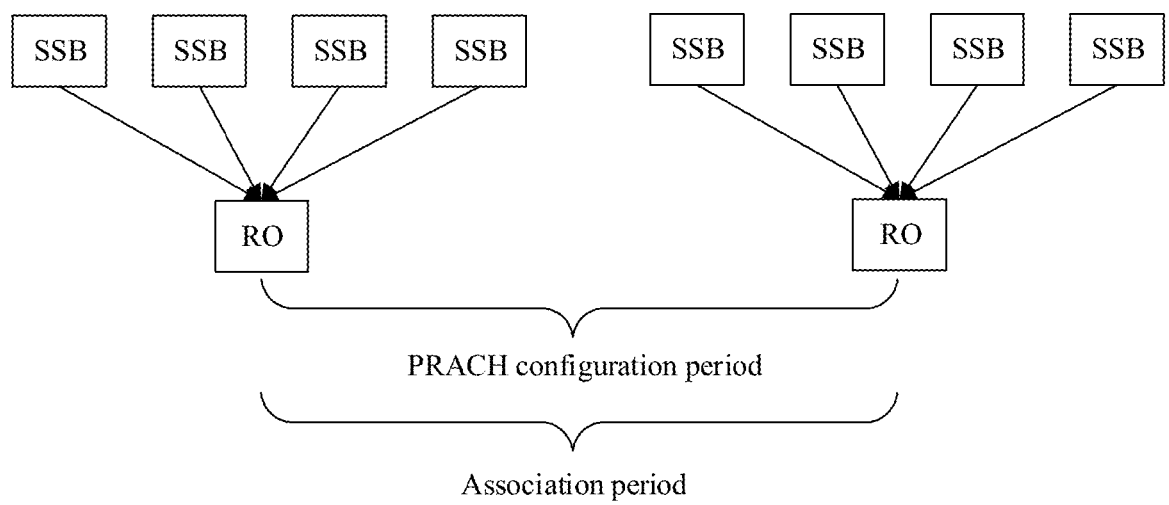
FIG. 2E is a schematic diagram of another association period between an SSB and an RO according to an embodiment of this application.

When a plurality of SSBs correspond to one RO, a PRACH configuration period included in the association period satisfies T=⌈n/(N*R)⌉×t, where n indicates a quantity of SSBs, N indicates a quantity of SSBs corresponding to one RO, and R indicates a quantity of ROs in one PRACH configuration period. FIG. 2E is a schematic diagram of another association period between an SSB and an RO according to an embodiment of this application. As shown in FIG. 2E, assuming that four SSBs correspond to one RO, there are a total of eight SSBs corresponding to two ROs, and one PRACH configuration period includes two ROs, the association period is T=8/4/2×t=t, that is, the association period corresponds to one PRACH configuration period.

In the formula in this embodiment of this application, if a calculation result obtained after division by R is a decimal, an integer quantity of PRACH configuration periods are obtained by using a rounding function.

It can be learned from the foregoing description that the association period between an SSB and an RO is related to the PRACH configuration period and is in direct proportion to the PRACH configuration period. A quantity of ROs in one PRACH configuration period is limited, and a quantity of preambles corresponding to one RO is also limited. Therefore, a quantity of SSBs that can be associated with a preamble sequence is also limited. Therefore, in an NTN, when a quantity of SSBs and a quantity of preamble sequences increase, if an SSB is associated with an RO in a conventional manner, an association period between the SSB and the RO increases. Consequently, a time interval at which the UE initiates random access becomes longer, and user experience is affected.

Figure 3A:
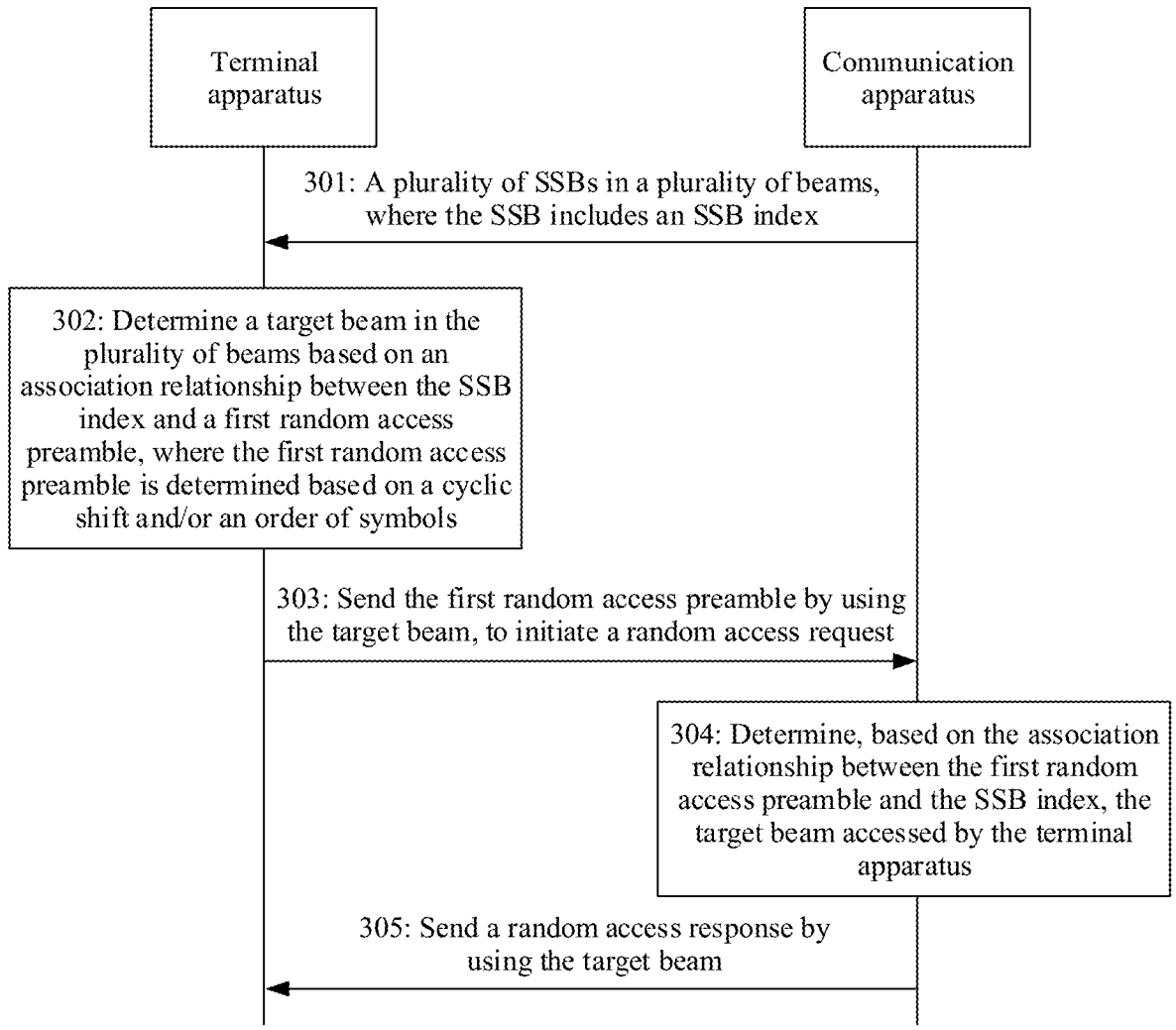
FIG. 3A is a schematic flowchart of a channel access method according to an embodiment of this application.

To resolve the foregoing problem, FIG. 3A is a schematic flowchart of a beam establishment method according to an embodiment of this application. As shown in FIG. 3A, the beam establishment method includes the following steps.

301: A terminal apparatus obtains a plurality of synchronization signal and PBCH blocks SSBs in a plurality of beams, where the SSB includes an SSB index.

A satellite beam periodically scans and sends an SSB in a time sharing mode. When a beam scanning signal for sending the SSB covers UE, the UE completes downlink synchronization by using the SSB in the beam. First, a related parameter in the SSB is obtained, for example, master information block (MIB) in a physical broadcast channel (PBCH), including information such as a system frame number, a subcarrier spacing of the SSB, a subcarrier offset of the SSB, and an SSB index. Downlink synchronization is performed based on the obtained system information. Further, uplink random access may be further performed based on related information, for example, the SSB index, to complete beam establishment.

302: The terminal apparatus determines a target beam in the plurality of beams based on an association relationship between the S SB index and a first random access preamble, where the first random access preamble is determined based on a cyclic shift and/or an order of symbols, the symbol is a symbol of a sequence part in the first random access preamble, and the sequence part includes at least two types of symbols.

It is learned from the foregoing description that, in a random access procedure, the SSB index is associated with an RO. In essence, the SSB is associated with a random access preamble allocated on the RO. A maximum quantity of preambles on one RO is 64, but a quantity of SSBs is far greater than this quantity. Therefore, when preamble resources on the RO are insufficient, a manner of associating one preamble with a plurality of SSBs may be used to reduce an association period between the RO and the plurality of SSBs, to improve association efficiency.

Optionally, a cyclic shift is added to the preamble to generate a new preamble sequence to implement the association between the one preamble and the plurality of SSBs. The cyclic shift is a position by which an entire sequence moves in a direction based on an original preamble sequence.

Figure 3B:
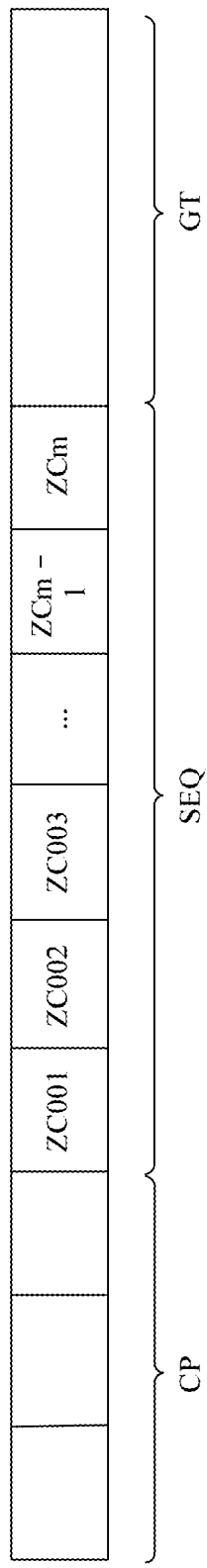
FIG. 3B(a) and FIG. 3B(b) are a schematic diagram of a preamble sequence according to an embodiment of this application.
Figure 3B:
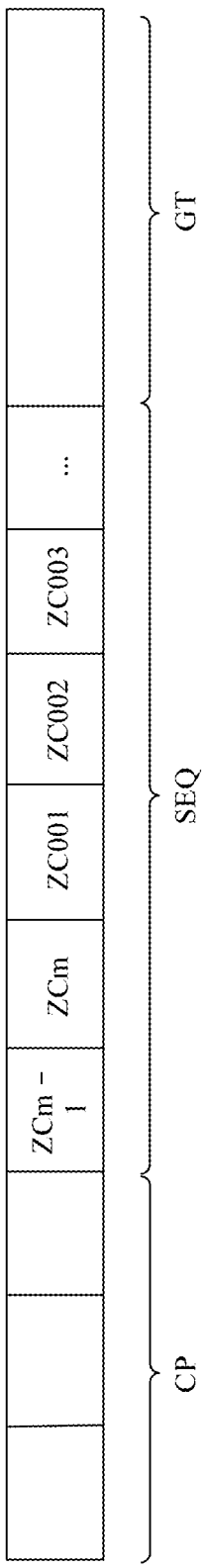

FIG. 3B(a) and FIG. 3B(b) are a schematic diagram of a preamble sequence according to an embodiment of this application. As shown in FIG. 3B(a), the preamble may be formed by a cyclic prefix (CP), a sequence (SEQ), and a guard band GT, where the SEQ may be a ZC sequence, an m sequence, or the like. The ZC sequence is used as an example. Assuming the ZC sequence includes m ZC symbols: ZC001, ZC002, . . . , and ZCm, and a cyclic shift corresponding to the ZC sequence is 2, all ZC symbols in the ZC sequence are sequentially shifted rightwards by two positions. The ZC sequence corresponds to a new preamble sequence shown in FIG. 3B(b), and the new preamble sequence may be used to be associated with one SSB.

The ZC sequence may include a ZC sequence used for detecting fractional delay estimation and a ZC sequence used for detecting integer delay estimation. In this embodiment of this application, because a round-trip transmission delay in an NTN is large, a cyclic shift cannot be performed on the ZC sequence used for detecting fractional delay estimation, and a cyclic shift is performed only on the ZC sequence used for detecting integer delay estimation.

In NR, there are two types of lengths of the ZC sequence: 839 and 139, and cyclic shift Cv ranges corresponding to the lengths of the ZC sequence are [0, 838] and [0, 138]. When ssb-perRACH-Occasion>=1, in other words, when a plurality of SSBs correspond to one RO, the cyclic shift is added to a ZC sequence used for detecting integer time offset estimation. When a length of the ZC sequence is 839, 839 cyclic shifts may be added. In this case, a maximum quantity of SSBs corresponding to one RO is 839×64. When the length of the ZC sequence is 139, 139 cyclic shifts may be added, and a maximum quantity of SSBs corresponding to one RO is 139×64. One cyclic shift may be used to be associated with one SSB index, or a plurality of cyclic shifts may be used to be associated with one SSB index.

Optionally, a cyclic shift value may be delivered by a satellite. For example, when the satellite delivers an SSB, the cyclic shift value may be added to system information of the SSB. In this case, the UE may determine, based on a selected preamble and an available cyclic shift value in the obtained SSB, a new preamble corresponding to the UE. FIG. 3C is a schematic diagram of signaling of delivering a cyclic shift value according to an embodiment of this application. The delivering a corresponding cyclic shift value by using RACH-ConfigGeneric signaling may be shown by an italic ssb-ro-cv field in FIG. 3C. For preamble sequences on a same RO, cyclic shifts are one-to-one mapped to SSB indexes in a pre-agreed order (for example, in ascending order or in descending order) based on an ssb-ro-cv field delivered by a satellite. For example, ssb-perRACH-Occasion=4 in FIG. 2C, in other words, four SSBs correspond to one RO. In this case, a cyclic shift may be performed, based on the first four Cvs in the ssb-ro-cv signaling, on a ZC sequence for detecting integer time offset estimation, that is, Cvs=(0, 1, 2, 3), to obtain new ZC sequences, and the ZC sequences for detecting integer time offset estimation and SSB indexes are one-to-one mapped in sequence. After detecting a corresponding preamble sequence by using a corresponding Cv, the satellite may determine an access beam selected by the terminal apparatus, and complete a beam establishment processing process.

Optionally, the cyclic shift is obtained through calculation based on at least an SSB index and a length parameter of a PRACH sequence.

A cyclic shift is added to the preamble, so that a new preamble sequence generated based on the original preamble sequence and the cyclic shift can be associated with an SSB. Therefore, the cyclic shift corresponds to the SSB index. In addition, the cyclic shift is performed on the preamble sequence. Therefore, a cyclic shift value is related to a sequence length of the preamble.

Optionally, the cyclic shift satisfies $C_v=(n*SSB_{index}+\text{offset})\% L_{RA}$, where $SSB_{index}$ indicates the SSB index, offset indicates an offset, and may be any integer, including a positive integer, zero, or a negative integer. $L_{RA}$ indicates a total sequence length of the preamble, and may be 839 or 139. n indicates a cyclic shift interval allocated to each SSB index, and n is a positive integer, which indicates that the cyclic shift interval is an integer value. n may alternatively be a negative integer, which indicates a cyclic shift interval in a direction opposite to that when n is a positive integer. % indicates a remainder operation, and the remainder operation on $L_{RA}$ indicates that the cyclic shift value is not greater than $L_{RA}$.

For example, ssb-perRACH-Occasion=4 is configured as shown in FIG. 2C, that is, four SSBs correspond to one RO. Assuming that n is 10, the offset is 0, $L_{RA}$ is 839, and $SSB_{indexes}$ are 0, 1, 2, and 3, Cvs that correspond to the four SSB indexes and that are obtained through calculation are 0, 10, 20, and 30. In this case, the terminal apparatus and the satellite may establish a mapping relationship between the SSB index and the cyclic shift on the RO shown in Table 1.

TABLE 1

| SSB index | $C_v$ |
|---|---|
| 0 | 0 |
| 1 | 10 |
| 2 | 20 |
| 3 | 30 |

Because there are a large quantity of SSBs in an NTN, a quantity of SSBs corresponding to one RO may exceed a quantity of cyclic shifts, and a plurality of SSB indexes may correspond to a same cyclic shift. To avoid this case, a preset rule may be used to limit a mapping relationship between an SSB index and a cyclic shift, for example, adjacent SSB indexes are mapped to a same RO. In this case, if a cyclic shift mapped to an SSB index and a cyclic shift mapped to an adjacent SSB index suddenly decrease, for example, a cyclic shift corresponding to an SSB whose SSB index is 4 is 120, and a cyclic shift corresponding to an SSB whose SSB index is 5 is 10, it indicates that the latter SSB index needs to correspond to a next RO, to avoid a case in which the latter SSB index and the former SSB index correspond to a same cyclic shift. Alternatively, when a cyclic shift corresponding to an SSB index is a cyclic shift that has occurred, the SSB may correspond to a next RO. In this way, no ambiguity problem occurs when the satellite determines an SSB index based on a cyclic shift.

Values of n and offset in the foregoing formula may be delivered by using RACH-ConfigGeneric signaling, or may use fixed values known to the terminal apparatus and the satellite. If the values of n and offset in the foregoing formula are delivered by using the signaling, a form may be shown by a protocol field in signaling in FIG. 3D, and ellipses in INTEGER ( . . . ) indicate specified values of n and offset.

The foregoing formula for calculating the cyclic shift is merely an example form, and is not limited to this expression form. Calculation formulas in other forms derived from the idea all fall within the protection scope of the present disclosure.

Optionally, different symbol ordering is performed on a preamble to generate a new preamble sequence to implement an association between the preamble and a plurality of SSBs. The symbol is a symbol in the preamble sequence.

It can be learned from the foregoing description that the preamble sequence may include a ZC sequence, an m sequence, or the like. On a premise that root sequences are the same, symbol orders of the preamble sequence may be different, and a symbol order corresponds to an SSB. In this way, the satellite may determine, based on an order of the detected symbol orders of the preamble sequence, a beam accessed by the UE. FIG. 3E(a) and FIG. 3E(b) are a schematic diagram of different symbol orders of a preamble sequence according to an embodiment of this application. As shown in FIG. 3E(a) and FIG. 3E(b), the preamble sequence includes ZC0 used for detecting integer delay estimation and ZC1 used for detecting fractional delay estimation, where a quantity of symbols in the ZC0 is 1, and a quantity of symbols in the ZC1 is 5. Different orders may form different patterns. In FIG. 3E(a), ZC0 in a pattern 1 is the first one in the sequence, and in FIG. 3E(b), ZC1 in a pattern 2 is the fourth one in the sequence. The two bits may be used to be associated with different SSB indexes.

In addition, when different symbol orders of the preamble sequence are separately associated with a plurality of SSB indexes, it should be noted that a detection delay between different symbol orders cannot be less than a detection delay corresponding to a CP, to avoid UE detection ambiguity occurring when the satellite determines, based on an association relationship between different preamble sequences and SSB indexes, a beam corresponding to the UE.

Optionally, a symbol order may alternatively be delivered by the satellite. For example, when the satellite delivers an SSB, a symbol order may be added to system information of the SSB. In this case, the UE may determine, based on a selected preamble and an available symbol order in the obtained SSB, a new preamble sequence corresponding to the UE. Finally, new preamble sequences and a plurality of SSB indexes are one-to-one mapped in an agreed order. The agreed order may be an ascending order of the SSB indexes, or may be a time order of delivering the SSB indexes, or the like.

Optionally, when the satellite delivers an SSB, a cyclic shift and a symbol order may be added to system information of the SSB. In this case, the UE may determine, based on a selected preamble and the available cyclic shift and symbol order in the obtained SSB, a new preamble sequence corresponding to the UE, so that the new preamble sequence is associated with an SSB index.

303: The terminal apparatus sends a first random access preamble to a network device by using the target beam, to initiate a random access request.

304: A communication apparatus receives the first random access preamble in the random access request sent by the terminal apparatus, and determines, based on an association relationship between the first random access preamble and the SSB index, the target beam accessed by the terminal apparatus.

305: The communication apparatus sends a random access response to the terminal apparatus by using the target beam.

The UE determines, based on the association relationship between the SSB index and the first random access preamble sequence on the RO, a target beam accessed by the UE, and then the UE sends the first random access preamble sequence by using the target beam, to initiate random access to the network device. The network device obtains, through parsing based on the detected first random access preamble sequence and the association relationship between the first random access preamble sequence and the SSB index, the target beam accessed by the UE, and then sends the random access response to the UE by using the target beam. In non-contention-based random access, the random access procedure has been completed in this step. In contention-based random access, a subsequent connection request initiation process and a subsequent conflict resolution process need to be further performed.

It can be learned that in this embodiment of this application, after synchronization is performed based on the SSB delivered by the satellite, the UE obtains the first random access preamble, where the first random access preamble includes the cyclic shift or the order of symbols, or includes both the cyclic shift and the order of symbols. Then, the UE determines, based on the association relationship between the first random access preamble and the SSB index, the target beam accessed by the UE and finally, performs random access by using the target beam, to complete beam establishment. In this process, because the preamble has the cyclic shift and/or the order of symbols, a quantity of UEs that can access the network device by using the same RO increases, so that a time interval at which the terminal apparatus initiates random access is reduced, and user experience is effectively improved.

Figure 4:
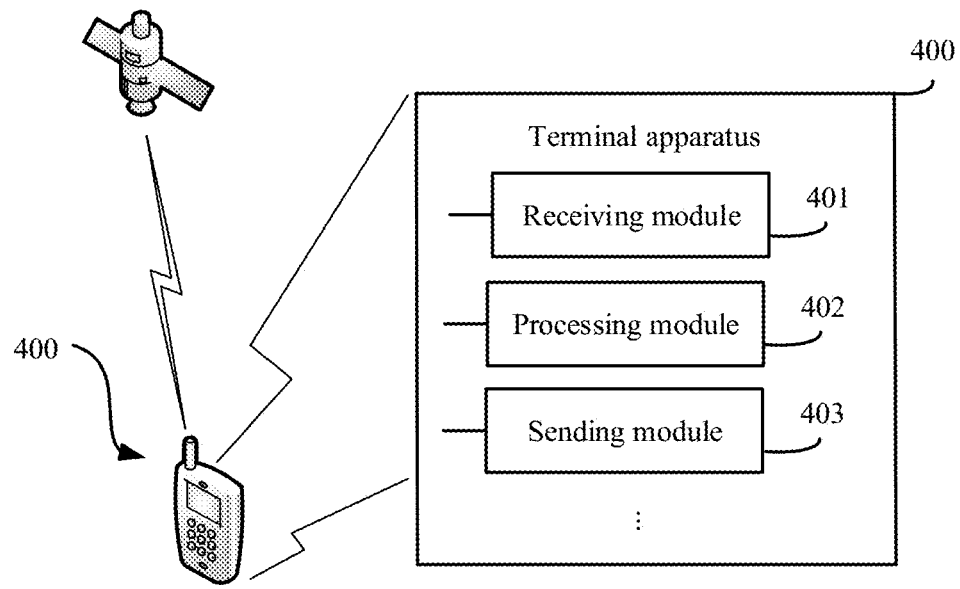
FIG. 4 is a schematic block diagram of a terminal apparatus according to an embodiment of this application.

Based on a same technical idea as the foregoing beam establishment method, as shown in FIG. 4, a terminal apparatus 400 is provided. The terminal apparatus may be used for satellite communication. The terminal apparatus 400 can perform the steps performed by the terminal apparatus in the method in FIG. 3A. To avoid repetition, details are not described herein again. In a design, the apparatus may include modules that one-to-one correspond to the methods/operations/steps/actions described in FIG. 3A. The modules may be implemented by a hardware circuit, software, or a combination of a hardware circuit and software. In a design, the terminal apparatus 400 may be a terminal apparatus, or may be a chip applied to a terminal apparatus. The terminal apparatus 400 includes a receiving module 401, a processing module 402, and a sending module 403. Optionally, the terminal apparatus 400 further includes a storage module 404 (not shown in the figure). The receiving module 401, the sending module 403, and the storage module 404 are separately connected to the processing module 402, and the receiving module 401 and the sending module 403 may also be connected to the storage module 404.

The storage module 404 is configured to store computer programs. More specifically, a function of the storage module 930 may be performed by using a memory. An exemplary type of the memory is described below.

For example, the receiving module 401 is configured to obtain a plurality of synchronization signal and PBCH blocks SSBs in a plurality of beams.

The processing module 402 is configured to determine a target beam in the plurality of beams based on all or some of the computer programs stored in the storage module 404 and based on an association relationship between the SSB index and a first random access preamble, where the first random access preamble includes a cyclic shift and/or an order of symbols, and the symbol is a sequence symbol in the preamble. More specifically, a processor or a processing chip may be used to perform a function of the processing module 402, and an exemplary type of the processor or the processing chip is described below.

The sending module 403 is configured to send the first random access preamble to a network device by using the target beam, to initiate a random access request.

Optionally, the receiving module 401 is further configured to receive a random access response delivered by using the target beam, to complete beam establishment.

Optionally, the receiving module 401 is further configured to receive indication information, where the indication information is used to indicate the cyclic shift and/or the order of symbols.

Optionally, the receiving module 401 and the sending module 403 may alternatively be a transceiver module, and the transceiver module is configured to perform the method steps performed by the receiving module 401 and the sending module 403.

Figure 5:
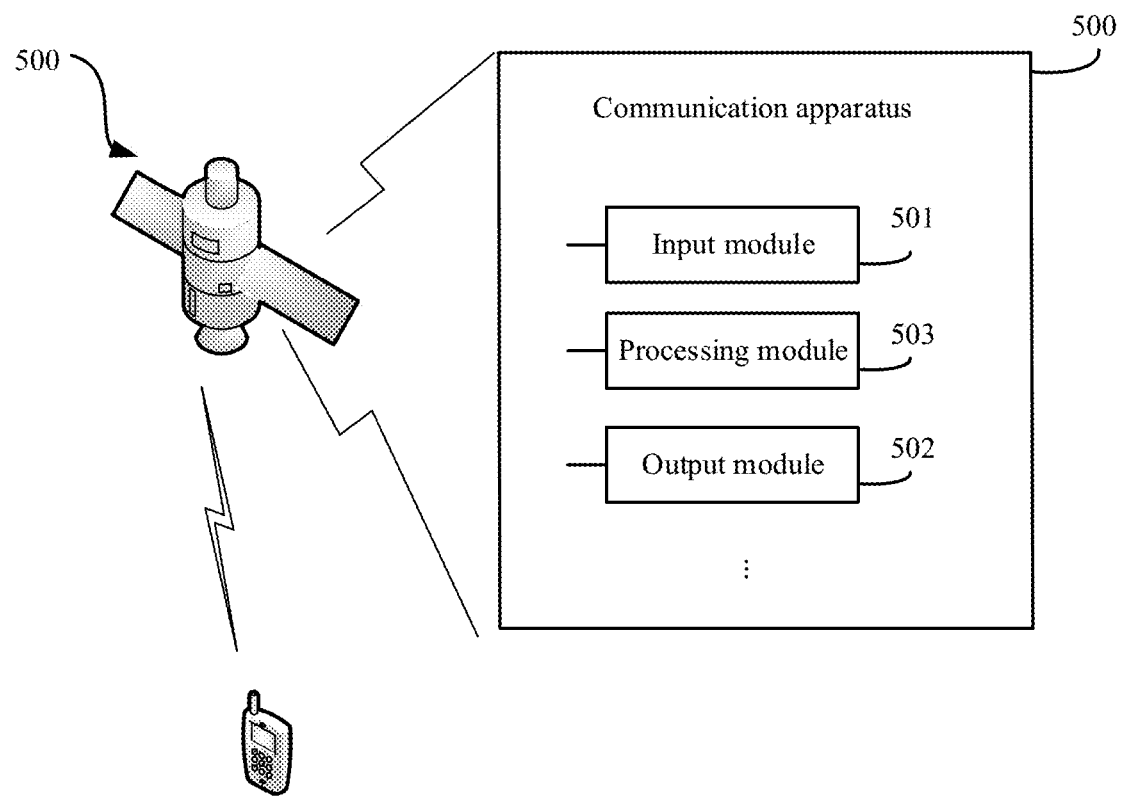
FIG. 5 is a schematic block diagram of a communication apparatus according to an embodiment of this application.

Based on a same technical idea as the foregoing beam establishment method, FIG. 5 is a schematic block diagram of a communication apparatus 500 according to an embodiment of this application. The communication apparatus may be used for satellite communication. It should be understood that the communication apparatus 500 can perform the steps performed by the communication apparatus in the method in FIG. 3A. To avoid repetition, details are not described herein again. In a design, the communication apparatus may include modules that one-to-one correspond to the methods/operations/steps/actions described in FIG. 3A. The modules may be implemented by a hardware circuit, software, or a combination of a hardware circuit and software. In a design, the communication apparatus 500 includes an input module 501, an output module 502, and a processing module 503. During exemplary implementation, the output module 502 and the input module 501 may be one module: an I/O module.

The input module 501 is configured to receive a first random access preamble in a random access request sent by a terminal apparatus. More specifically, a function of the input module 501 may be performed by using an antenna, a radio frequency module, a transceiver, or a combination thereof.

The processing module 503 is configured to determine, by the communication apparatus based on an association relationship between the first random access preamble and an SSB index, a target beam accessed by the terminal apparatus, where the first random access preamble includes a cyclic shift and/or an order of symbols, and the symbol is a sequence symbol in the preamble. More specifically, a function of the processing module 503 may be performed by using a processor or a processing chip. An exemplary type of the processor or the processing chip is described below.

The output module 502 is configured to send a random access response by using the target beam. More specifically, a function of the output module 502 may be performed by using an antenna, a radio frequency module, a transceiver, or a combination thereof.

Optionally, the output module 502 is further configured to receive indication information, where the indication information is used to indicate the cyclic shift and/or the order of symbols.

Figure 6:
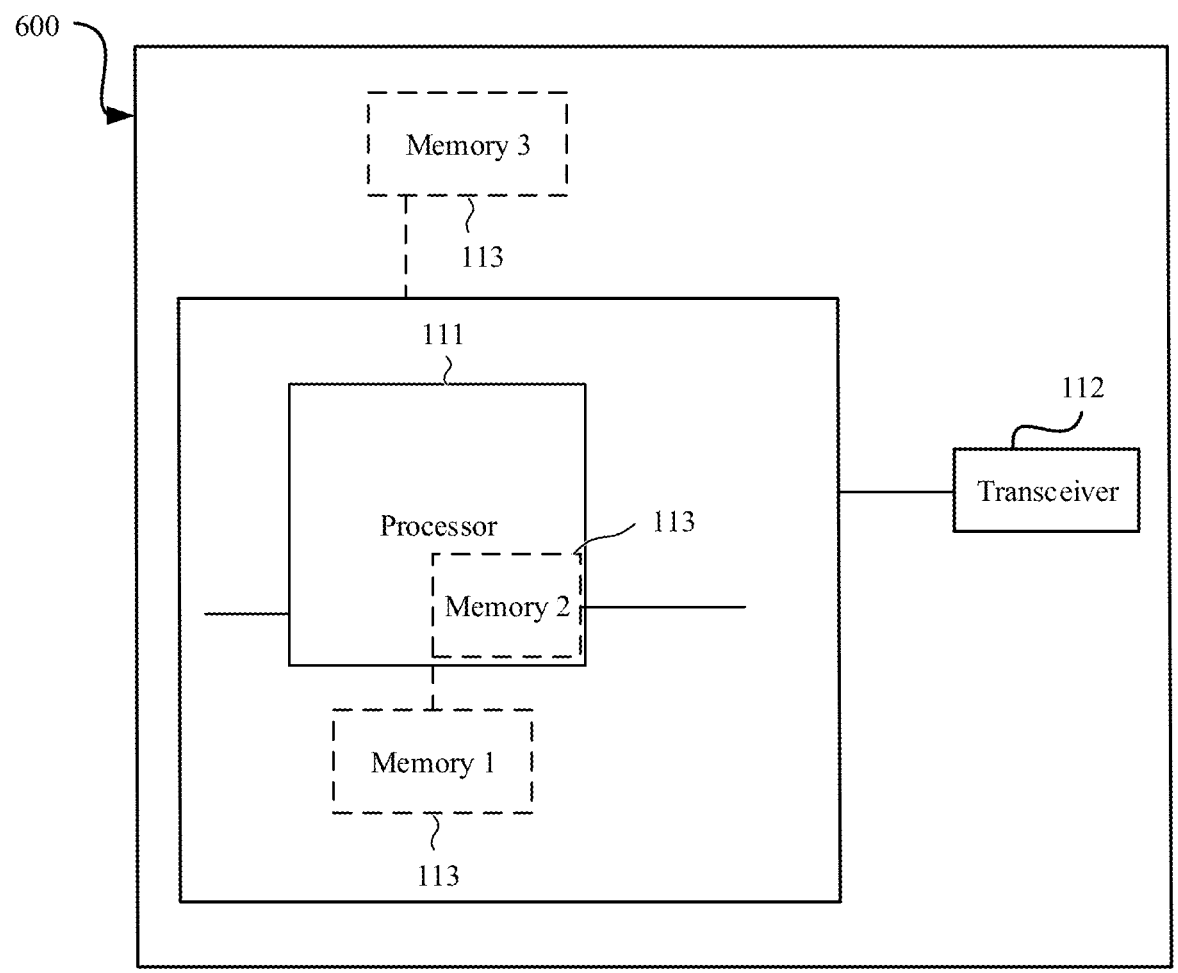
FIG. 6 is a block diagram of a structure of another communication apparatus according to an embodiment of this application.

FIG. 6 is a block diagram of a structure of a communication apparatus 600 according to an embodiment of this application. It should be understood that the communication apparatus 600 can perform the steps performed by the terminal apparatus or the communication apparatus in the method in FIG. 3A. To avoid repetition, details are not described herein again. The communication apparatus 600 includes a processor 111 and a memory 113, where the processor 111 and the memory 113 are electrically coupled.

The memory 113 is configured to store computer program instructions. Optionally, a memory 1 is located in the apparatus, a memory 2 is integrated with the processor 111, or a memory 3 is located outside the apparatus.

The processor 111 is configured to execute some or all of the computer program instructions in the memory, and when some or all of the computer program instructions are executed, the apparatus is enabled to perform the method in any one of the foregoing embodiments.

Optionally, the communication apparatus 600 further includes a transceiver 112. The transceiver 112 is configured to communicate with another device. For example, the transceiver 112 receives synchronization signal and PBCH blocks SSBs in a plurality of beams sent by a network device.

It should be understood that the communication apparatus 600 shown in FIG. 6 may be a chip or a circuit. For example, the communication apparatus 600 may be a chip or a circuit disposed in the terminal apparatus or the communication apparatus. The transceiver 112 may alternatively be a communication interface. The transceiver includes a receiver and a transmitter. The communication apparatus 600 may further include a bus system.

The processor 111, the memory 113, and the transceiver 112 are connected through the bus system. The processor 111 is configured to execute the instructions stored in the memory 113, to control the transceiver to receive and send signals, and complete steps of the communication apparatus or the terminal apparatus in the implementation method in this application. The memory 113 may be integrated into the processor 111, or may be disposed separately from the processor 111.

In an implementation, it may be considered that a function of the transceiver 112 is implemented by a transceiver circuit or a dedicated transceiver chip. It may be considered that the processor 111 is implemented by a dedicated processing chip, a processing circuit, a processor, or a general-purpose chip. The processor may be a central processing unit (CPU), a network processor (NP), or a combination of the CPU and the NP. The processor may further include a hardware chip or another general-purpose processor. The hardware chip may be an application-specific integrated circuit (ASIC), a programmable logic device (PLD), or a combination thereof. The PLD may be a complex programmable logic device (CPLD), a field-programmable logic gate array (FPGA), a generic array logic (GAL) device, another programmable logic device, a discrete gate or a transistor logic device, a discrete hardware component, or the like, or a combination thereof. The general-purpose processor may be a microprocessor, or the processor may be any conventional processor or the like.

It should be further understood that the memory in embodiments of this application may be a volatile memory, or a non-volatile memory, or may include both a volatile memory and a non-volatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory described in this application is intended to include but is not limited to these memories and any other memory of a suitable type.

An embodiment of this application provides a computer storage medium. The computer storage medium stores a computer program, where the computer program is used to perform the foregoing method.

An embodiment of this application provides a computer program product including instructions. When the computer program product is run on a computer, the computer is enabled to perform the foregoing provided method.

Figure 7:
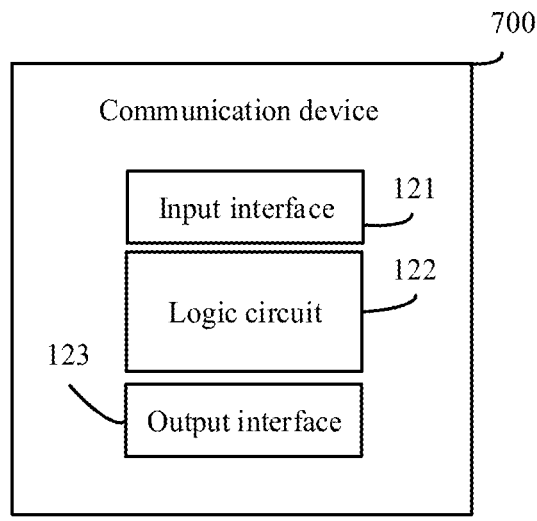
FIG. 7 is a schematic block diagram of another terminal apparatus according to an embodiment of this application.

FIG. 7 shows a terminal apparatus 700 according to an embodiment of this application. The terminal apparatus 700 may be configured to perform the foregoing beam establishment method and exemplary embodiments. The apparatus may be a communication device or a chip in a communication device. As shown in FIG. 7, the apparatus includes at least one input interface (Input (s)) 121, a logic circuit 122, and at least one output interface (Output (s)) 123.

The input interface 121 is configured to obtain a plurality of synchronization signal and PBCH blocks SSBs in a plurality of beams.

The logic circuit 122 is configured to determine a target beam in the plurality of beams based on an association relationship between an SSB index and a first random access preamble, where the first random access preamble is determined based on a cyclic shift and/or an order of symbols, the symbol is a symbol of a sequence part in the first random access preamble, and the sequence part includes at least two types of symbols.

The output interface 123 is configured to send the first random access preamble by using the target beam, to initiate a random access request.

Optionally, the input interface 121 is further configured to receive a random access response delivered by using the target beam, to complete beam establishment.

Optionally, the foregoing logic circuit 122 may be a chip, an encoder, an encoding circuit, or another integrated circuit that can implement the method in this application.

The exemplary method and embodiments have been described above, and the apparatus 700 is only configured to perform the beam establishment method of the terminal apparatus. Therefore, for exemplary descriptions of the configuration method, and in particular, for a function of the logic circuit 122 or the output interface 123, refer to a related part in a corresponding embodiment. Details are not described herein again.

Figure 8:
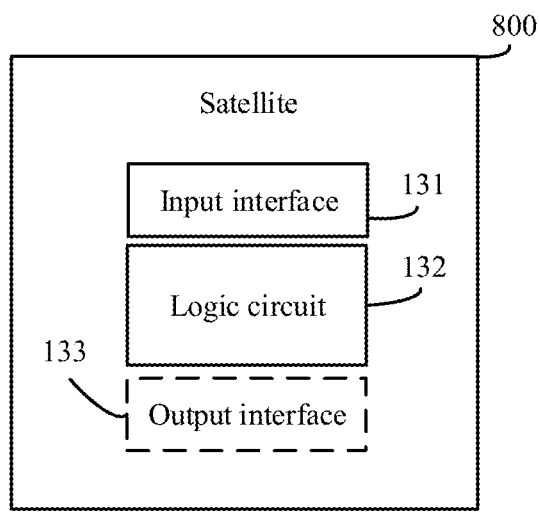
FIG. 8 is a schematic block diagram of another communication apparatus according to an embodiment of this application.

FIG. 8 shows a communication apparatus 800 according to an embodiment of this application. The communication apparatus 800 may be configured to perform the foregoing beam establishment method and exemplary embodiments. The network device may be a satellite or a communication chip in a satellite. As shown in FIG. 8, the apparatus includes at least one input interface (Input (s)) 131, a logic circuit 132, and at least one output interface (Output (s)) 133.

The input interface 131 is configured to receive a first random access preamble in a random access request.

The logic circuit 132 is configured to determine, based on an association relationship between the first random access preamble and a synchronization signal and PBCH block SSB index, a target beam accessed by a terminal apparatus, where the first random access preamble is determined based on a cyclic shift and/or an order of symbols, the symbol is a symbol of a sequence part in the first random access preamble, and the sequence part includes at least two types of symbols.

The output interface 133 is configured to send a random access response by using the target beam.

Optionally, the foregoing logic circuit 132 may be a chip, an encoder, an encoding circuit, or another integrated circuit that can implement the method in this application.

An exemplary method and embodiments have been described above, and the apparatus 800 is only configured to perform the beam establishment method of the network device. Therefore, for exemplary descriptions of the configuration method, and in particular, for a function of the logic circuit 132 or the output interface 133, refer to a related part in a corresponding embodiment. Details are not described herein again.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraints of the technical solutions. A person skilled in the art may use a different method to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the described apparatus embodiments are merely examples. For example, division into the units is merely logical function division and may be other division in actual implementation, for example, a plurality of units or components may be combined or integrated into another system, or some features may be ignored or not performed. In addition, the displayed or discussed mutual communication connections may be implemented through some interfaces. The indirect couplings or communication connections between the apparatuses or units may be implemented in electrical, mechanical, or other forms.

In addition, units in the apparatus embodiments of this application may be integrated into one processing unit, or each of the units may exist alone physically, or two or more units are integrated into one unit.

It may be understood that the processor in embodiments of this application may be a central processing unit (CPU), or may be another general-purpose processor, a digital signal processor (DSP), an application-specific integrated circuit (ASIC), a field-programmable gate array (FPGA), or another programmable logic device, a transistor logic device, a hardware component, or any combination thereof. The general-purpose processor may be a microprocessor or any conventional processor.

All or some of the methods in embodiments of this application may be implemented by software, hardware, firmware, or any combination thereof. When the software is used to implement the embodiments, the embodiments may be implemented completely or partially in a form of a computer program product. The computer program product includes one or more computer programs or instructions. When the computer programs or instructions are loaded and executed on the computer, the procedure or functions in embodiments of this application are all or partially performed. The computer may be a general-purpose computer, a dedicated computer, a computer network, or another programmable apparatus. The computer programs or instructions may be stored in a computer-readable storage medium, or may be transmitted by using the computer-readable storage medium. The computer-readable storage medium may be any usable medium accessible by a computer, or a data storage device such as a server integrating one or more usable media. The usable medium may be a magnetic medium, for example, a floppy disk, a hard disk, or a magnetic tape, or may be an optical medium, for example, a CD-ROM or a DVD, or may be a semiconductor medium, for example, a solid state disk (SSD), a random access memory (RAM), a read-only memory (ROM), or a register.

A person skilled in the art should understand that embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing an exemplary function in one or more processes in the flowcharts and/or in one or more blocks in the block diagrams.

What is claimed is:

1. A beam establishment method, wherein the method comprises:
    obtaining, by a terminal apparatus, synchronization signal and physical broadcast channel (PBCH) blocks (SSBs) in a plurality of beams, wherein each of the SSBs comprises an SSB index;
    determining, by the terminal apparatus, a target beam in the plurality of beams based on an association relationship between the SSB index and a first random access preamble, wherein the first random access preamble is determined based on at least one of a cyclic shift and an order of symbols, the symbols are symbols of a sequence part in the first random access preamble, and the sequence part comprises at least two types of symbols;

and sending, by the terminal apparatus, the first random access preamble by using the target beam to initiate a random access request, wherein the cyclic shift is obtained through a calculation based on at least the SSB index and a sequence length of the first random access preamble.

2. The method according to claim 1, wherein determining, by the terminal apparatus, the target beam in the plurality of beams based on the association relationship between the SSB index and the first random access preamble comprises:

obtaining, by the terminal apparatus, the first random access preamble;

and determining, by the terminal apparatus, a target SSB based on the association relationship between the first random access preamble and the SSB index, and determining, by the terminal apparatus, a beam corresponding to the target SSB as the target beam.

3. The method according to claim 1, wherein the cyclic shift satisfies:

$C_v = (n*SSB_{index} + \text{offset}) \% L_{RA}$, wherein $SSB_{index}$ indicates the SSB index, offset indicates an offset, $L_{RA}$ indicates the sequence length of the first random access preamble, n is an integer, and % indicates a remainder operation.

4. The method according to claim 1, wherein after the SSBs in the plurality of beams are obtained, the method further comprises:

receiving, by the terminal apparatus, indication information, wherein the indication information indicates the cyclic shift and/or the order of symbols.

5. A terminal apparatus, wherein the apparatus comprises:

a receiver, configured to obtain synchronization signal and physical broadcast channel (PBCH) blocks (SSBs) in a plurality of beams, wherein each of the SSBs comprises an SSB index;

a processor, configured to determine a target beam in the plurality of beams based on an association relationship between the SSB index and a first random access preamble, wherein the first random access preamble is determined based on at least one of a cyclic shift and an order of symbols, the symbols are symbols of a sequence part in the first random access preamble, and the sequence part comprises at least two types of symbols;

and a sender, configured to send the first random access preamble by using the target beam to initiate a random access request, wherein the cyclic shift is obtained through a calculation based on at least the SSB index and a sequence length of the first random access preamble.

6. The apparatus according to claim 5, wherein after the SSBs in the plurality of beams are obtained, the receiver is further configured to:

receive indication information, wherein the indication information indicates the cyclic shift and/or the order of symbols.

7. The apparatus according to claim 5, wherein determining the target beam in the plurality of beams based on the association relationship between the SSB index and the first random access preamble comprises the processor is configured to:

obtain the first random access preamble;

and determine a target SSB based on the association relationship between the first random access preamble and the SSB index, and determine a beam corresponding to the target SSB as the target beam.

8. The apparatus according to claim 5, wherein the cyclic shift satisfies:

$C_v = (n*SSB_{index} + \text{offset}) \% L_{RA}$, wherein $SSB_{index}$ indicates the SSB index, offset indicates an offset, $L_{RA}$ indicates the sequence length of the first random access preamble, n is an integer, and % indicates a remainder operation.

9. A communication apparatus, the communication apparatus comprising a processor and anon-transitory memory coupled to the processor and having processor-executable instructions stored thereon, which when executed, cause the communication apparatus to perform a method, comprising:

obtaining synchronization signal and physical broadcast channel (PBCH) blocks (SSBs) in a plurality of beams, wherein each of the SSBs comprises an SSB index;

determining a target beam in the plurality of beams based on an association relationship between the SSB index and a first random access preamble, wherein the first random access preamble is determined based on at least one of a cyclic shift and an order of symbols, the symbols are symbols of a sequence part in the first random access preamble, and the sequence part comprises at least two types of symbols;

and sending the first random access preamble by using the target beam to initiate a random access request, wherein the cyclic shift is obtained through a calculation based on at least the SSB index and a sequence length of the first random access preamble.

10. The communication apparatus according to claim 9, wherein determining the target beam in the plurality of beams based on the association relationship between the SSB index and the first random access preamble comprises:

obtaining the first random access preamble;

and determining a target SSB based on the association relationship between the first random access preamble and the SSB index, and determining a beam corresponding to the target SSB as the target beam.

11. The communication apparatus according to claim 8, wherein the cyclic shift satisfies:

$C_v = (n*SSB_{index} + \text{offset}) \% L_{RA}$, wherein $SSB_{index}$ indicates the SSB index, offset indicates an offset, $L_{RA}$ indicates the sequence length of the first random access preamble, n is an integer, and % indicates a remainder operation.

12. The communication apparatus according to claim 9, wherein after the SSBs in the plurality of beams are obtained, the method further comprises: receiving indication information, wherein the indication information indicates the cyclic shift and/or the order of symbols.

* * * * *

UNITED STATES PATENT AND TRADEMARK OFFICE
CERTIFICATE OF CORRECTION

PATENT NO. : 12,149,396 B2
APPLICATION NO. : 17/738863
DATED : November 19, 2024
INVENTOR(S) : Zhou et al.

Page 1 of 1

It is certified that error appears in the above-identified patent and that said Letters Patent is hereby corrected as shown below:

In the Claims

Claim 9: Column 20, Line 17: "ratus comprising a processor and anon-transitory memory" should read as -- ratus comprising a processor and a non-transitory memory --.

Signed and Sealed this
Third Day of June, 2025

Coke Morgan Stewart
*Acting Director of the United States Patent and Trademark Office*